United States Patent

Wilsch

[15] 3,672,602
[45] June 27, 1972

[54] MECHANISM FOR THREADING MOTION PICTURE FILM IN CINEMATOGRAPHIC APPARATUS

[72] Inventor: Herbert Wilsch, Unterhaching near Munich, Germany

[73] Assignee: Agfa-Gevaert Aktiengesellschaft, Leverkusen, Germany

[22] Filed: March 18, 1970

[21] Appl. No.: 20,558

[30] Foreign Application Priority Data

March 28, 1969 Germany ...................... P 19 15 969.4

[52] U.S. Cl. .......................................................242/192
[51] Int. Cl. .................G03b 1/02, B65h 17/14, G11b 15/32
[58] Field of Search..................242/192, 195, 197, 198, 201, 242/202, 206, 207, 208, 209, 210, 71.1; 352/157, 158, 72, 78

[56] References Cited

UNITED STATES PATENTS

| | | | |
|---|---|---|---|
| 3,550,879 | 12/1970 | Bundschuh et al. | ...................242/192 |
| 3,542,310 | 11/1970 | Vockenhuber et al. | ...............242/192 |
| 3,429,518 | 2/1969 | McKee | ...................242/186 |
| 3,550,881 | 12/1970 | Roman | ...................242/192 |

Primary Examiner—George F. Mautz
Attorney—Michael S. Striker

[57] ABSTRACT

Automatic film threading mechanism for use in motion picture projectors, comprising a driven endless elastic belt a portion of which is pivotable into engagement with the outermost convolution of film on the core of the supply reel to thereby rotate the reel in a direction to pay out the film. The belt is trained over a roller which rotates about a fixed axis, and such roller is surrounded by a stationary guide member or flanked by two guide rolls which prevent the film from engaging the belt in the region of the roller so that the belt can engage the film only when its aforementioned portion is pivoted into engagement with the outermost convolution.

10 Claims, 3 Drawing Figures

PATENTED JUN 27 1972 3,672,602

INVENTOR.
HERBERT WILSCH

MECHANISM FOR THREADING MOTION PICTURE FILM IN CINEMATOGRAPHIC APPARATUS

BACKGROUND OF THE INVENTION

The present invention relates to cinematographic apparatus in general, and more particularly to improvements in automatic film threading mechanisms for use in motion picture projectors. Still more particularly, the invention relates to improvements in the construction and mounting of those parts in an automatic threading mechanism which cause the leader of convoluted motion picture film to enter a predetermined path for travel toward the takeup reel in response to rotation of the supply reel.

It is already known to provide an automatic film threading mechanism with a friction drive including a driven endless flexible belt a portion of which is movable into and from frictional engagement with the outermost convolution of motion picture film on the supply reel. The purpose of such movability of the belt is to insure that the latter can properly engage the outermost convolution of a relatively large or a relatively small supply of convoluted film. Once the leader of the film is engaged by the customary film transporting mechanism of a motion picture projector and is thereupon attached to the core of the takeup reel, the film is subjected to a tensioning or stretching action which causes it to engage with a portion of the belt, even after the belt is moved away from engagement with the outermost convolution on the supply reel. Such engagement can cause damage to the film, not only during transport in a forward direction (toward the takeup reel) but particularly during rapid rewinding onto the supply reel. As a rule, the belt is trained over several rollers one of which is rotatable about the axis of a pivotable carrier for such rollers, and the tensioned film normally engages the belt in the region of the one roller, i.e., in the region where the belt travels along an arcuate path extending about the pivot axis for the carrier.

SUMMARY OF THE INVENTION

An object of the invention is to provide a cinematographic apparatus, particularly a motion picture projector, with novel and improved means for effecting automatic introduction of the leader of motion picture film into a predetermined path wherein the leader advances past the gate and toward the core of the takeup reel.

Another object of the invention is to provide novel and improved means for preventing continuous engagement of motion picture film with the friction drive which rotates the supply reel during the initial stage of transport of the leader of film toward the takeup reel.

A further object of the invention is to provide a cinematographic apparatus with novel means for effecting initial unwinding of motion picture film from the supply reel for the purpose of advancing the leader of such film into the range of the customary film transporting mechanism which thereupon advances the leader toward the core of the takeup reel.

An additional object of the invention is to provide an automatic film threading mechanism which is less likely to cause damage to motion picture film than heretofore known threading mechanisms.

The invention is embodied in a cinematographic apparatus, particularly in a motion picture projector, wherein motion picture film is transported from a supply reel toward a takeup reel. The apparatus includes a spindle, a cassette or analogous means for rotatably supporting a supply reel containing a supply of convoluted motion picture film with the leader of the film forming part of the outermost convolution of such supply, a friction drive including a driven endless transporting element and a carrier which supports the transporting element and is movable to and from an operative position in which the transporting element engages the outermost convolution of film on the supply reel and thereby rotates the supply reel in a direction to pay out successive increments of the film, and deflecting means for guiding such increments into a predetermined path away from contact with the transporting element, at least when the carrier dwells in its inoperative position.

The novel features which are considered as characteristic of the invention are set forth in particular in the appended claims. The improved film threading mechanism itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2, 3:
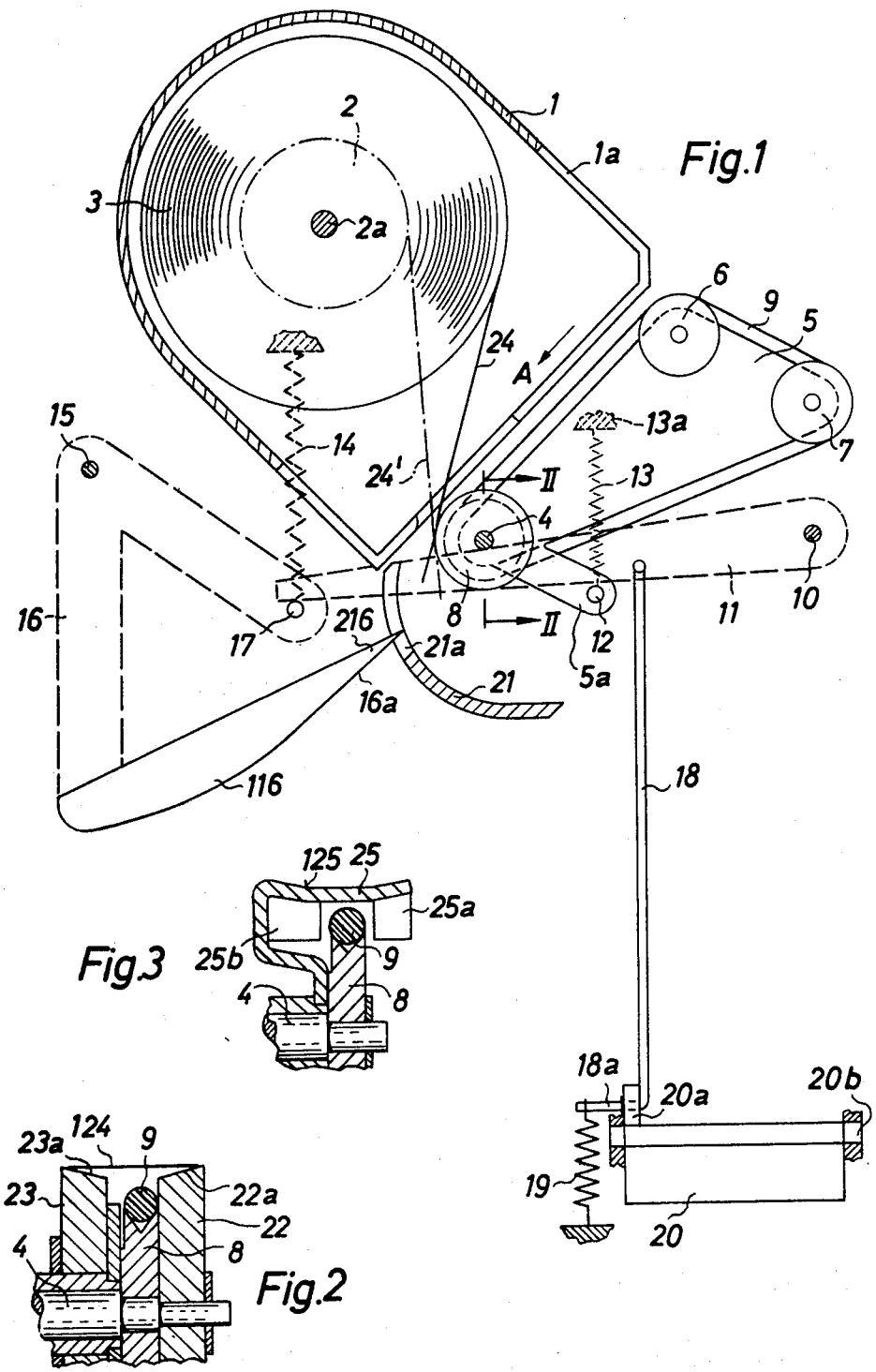
FIG. 1 is a fragmentary partly elevational and partly sectional view of a motion picture projector including an automatic film threading mechanism which embodies one form of the invention.
FIG. 2 is an enlarged fragmentary sectional view as seen in the direction of arrows from the line II—II of FIG. 1 and illustrates one form of the deflecting means for motion picture film.
FIG. 3 is a similar fragmentary sectional view but showing a second embodiment of the deflecting means.

Referring to FIG. 1, there is shown a cassette or magazine 1 which constitutes a means for supporting and enclosing a supply 3 of motion picture film which is convoluted around the core of a rotary supply reel 2. The leader of the film, which forms part of the outermost convolution of the supply 3, is shown at 24. The core of the supply reel 2 is rotatable about the axis of a shaft 2a. The friction drive which serves to rotate the reel 2 at least during the initial stage of automatic threading of motion picture film includes a plate-like carrier 5 which is pivotable about the axis of a fixedly mounted shaft 4 and supports three rollers 6, 7 and 8. An endless flexible transporting element in the form of an elastic belt 9 is trained over the rollers 6, 7, 8 and is driven to travel in a counterclockwise direction, as viewed in FIG. 1. A helical spring 13 which is attached to a stationary part 13a of the projector housing and to a post 12 on an extension 5a of the carrier 5 tends to pivot the carrier to an operative position in which the belt 9 engages the outermost convolution of the supply 3 of film on the reel 2 and rotates the latter in a clockwise direction, i.e., in a direction to pay out the film. The outermost convolution of the supply 3 is then engaged by that portion of the belt 9 which is trained over the roller 6. The cassette 1 is formed with a cutout or window 1a which permits entry of the roller 6. The roller 8 is rotatable about the axis of the shaft 4, i.e., that axis about which the carrier 5 can pivot to and from its operative position. The disengaging means which serves to normally hold the carrier 5 in the illustrated inoperative position comprises a one-armed lever 11 which is pivotable on a fixed pin 10 and overlies the post 12 for one end of the spring 13. A median portion of the lever 11 is articulately connected to one end portion of an elongated rod 18 whose other end portion 18a is bent over and is attached to one end of a relatively strong helical spring 19 serving to maintain the lever 11 in the position shown in FIG. 1 in which the post 12 stresses the spring 13 and maintains the carrier 5 in the inoperative position. The end portion 18a of the rod 18 is further connected to the arm 20a of a two-armed lever 20 which can be pivoted by hand about a shaft 20b to thereby move the rod 18 upwardly and to permit contraction of the spring 13 which immediately moves a portion of the belt 9 into engagement with the outermost convolution of the supply 3 of film on the reel 2. The belt 9 is preferably driven through the intermediary of one of the rollers 6–8, for example, by way of the roller 8.

The tip of the disengaging lever 11 engages a post 17 provided on a bell crank lever 16 which is pivotable on a fixed pin 15. A helical spring 14 is attached to the post 17 and tends to turn the bell crank lever 16 in a counterclockwise direction, as viewed in FIG. 1. One arm of the lever 16 carries a stripping member 116 having a wedge-like tip 216 which engages the outermost convolution of the supply 3 when the disengaging lever 11 is pivoted in a clockwise direction in response to manual pivoting of the lever 20. The tip 216 then causes the leader 24 to move away from the next-to-the-outermost convolution and toward the periphery of the roller 8. The bias of the spring 19 is stronger than the combined bias of springs 13 and 14 so that the parts of the film threading mechanism automatically assume the positions shown in FIG. 1 when the lever 20 is released.

When the user of the projector wishes to effect automatic transport of the leader 24 past the gate and toward attachment to the core of the takeup reel (not shown), the lever 20 is pivoted by hand to move the rod 18 upwardly and to permit contraction of springs 13 and 14. The spring 13 causes the carrier 5 to pivot toward its operative position in which the belt 9 (namely, that portion of the belt which is trained over the roller 6) engages the outermost convolution of the supply 3 and causes the reel 2 to rotate in a clockwise direction. The spring 14 causes the tip 216 of the stripping member 116 to engage the outer side of the supply 3 and to direct the leader 24 toward the roller 8 (arrow A in FIG. 1). The belt 9 begins to travel not later than when the carrier 5 assumes its operative position; the manner in which this belt is driven by the motor of the motion picture projector forms no part of the present invention. The outer side of the tip 216 is preferably provided with a suitably configured guide surface 16a which directs the leader 24 away from the supply 3 on the reel 2. The projector comprises customary guide elements including a concave plate 21 which cause the leader 24 to travel past the gate and toward the core of the takeup reel. In order to reduce friction between the stripping member 116 and the film, the width of the tip 216 is preferably less than the width of the film and the tip 216 extends through a slot 21a of the stationary guide element 21.

When the leader 24 is engaged by the conventional transporting mechanism of the projector (such as a sprocket wheel or the like), the film is subjected to a tensioning or stretching action which would cause successive increments of film to bear against that portion of the belt 9 which is trained over the roller 8. The position of this roller is selected in such a way that the film which is being withdrawn from the reel 2 would tend to bear against the respective portion of the belt 9 regardless of the diameter of the supply 3 (this is indicated by the phantom line 24'). Such positioning of the roller 8 is desirable to insure that the film is properly deflected toward the guide element 21. However, when the lever 20 is released so that the spring 19 is free to return the disengaging lever 11 to the position shown in FIG. 1, the film tends to rub against that portion of the belt 9 which is trained over the roller 8. Such rubbing could cause damage, especially when the film is being rapidly rewound onto the core of the supply reel 2.

In accordance with a feature of the present invention, such rubbing contact between the film and the belt 9 in the region of the roller 8 is prevented by the provision of a deflecting device which is shown in FIG. 2 and comprises two guide rolls 22, 23 which are mounted on the shaft 4 and flank the roller 8. FIG. 2 shows that the diameters of the guide rolls 22, 23 exceed the diameter of that portion of the belt 9 which is trained over the roller 8 so that the film 124 cannot engage the belt in the region of the roller 8, irrespective of position of the carrier 5. In order to further reduce the likelihood of damage, the peripheral film engaging surfaces 22a, 23a of the rolls 22, 23 are conical and taper toward the roller 8 so that each of these conical surfaces is engaged only by the marginal portion of the film 124. The rolls 22, 23 protect the film not only during threading but also when the friction drive is idle, i.e., when the carrier 5 dwells in the inoperative position shown in FIG. 1.

FIG. 3 illustrates a modified deflecting device which includes a stationary guide member 25 mounted on the shaft 4 or on a portion of the projector housing and constituting a shroud serving to overlie that portion of the belt 9 which is trained over the roller 8. The guide member 25 is provided with two suitably inclined lugs or ramps 25a, 25b which separate successive increments of the film from the belt 9 (in the region between the rollers 6 and 8) when the carrier 5 is held in operative position and the belt 9 rotates the reel 2 in a clockwise direction, as viewed in FIG. 1. The guide member 25 is provided with a concave external surface 125 whose purpose is the same as that of conical surfaces 22a, 23a on the guide rolls 22, 23 of FIG. 2.

The deflecting device of FIG. 2 is preferred at this time because the rolls 22, 23 rotate in response to lengthwise movement of the film 124 to further reduce the likelihood of damage.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a cinematographic apparatus, particularly in a motion picture projector, wherein motion picture film is transported from a supply reel to a takeup reel, a combination comprising means for rotatably supporting a supply reel containing a supply of convoluted film with the leader of film forming part of the outermost convolution of such supply; a friction drive including a driven endless transporting element, a carrier for said element, and pivot means supporting said carrier for angular movement to and from an operative position in which said transporting element engages the outermost convolution of film on the supply reel and rotates the supply reel in a direction to pay out successive increments of the film; and deflecting means mounted on said pivot means for guiding said increments into a predetermined path away from contact with said transporting element so that the latter engages the film only in the operative position of said carrier.

2. A combination as defined in claim 1, wherein said friction drive further comprises at least two rollers mounted on said carrier, said transporting element including a flexible belt which is trained over said rollers and one of said rollers being arranged to rotate about the axis of said pivot means.

3. A combination as defined in claim 2, wherein said belt consists at least in part of elastomeric material.

4. A combination as defined in claim 2, wherein said deflecting means comprises guide roll means having a diameter exceeding the diameter of that portion of said belt which is trained over said one roller, said guide roll means having peripheral surface means which guides said increments into said predetermined path.

5. In a cinematographic apparatus, particularly in a motion picture projector, wherein motion picture film is transported from a supply reel toward a takeup reel, a combination comprising means for rotatably supporting a supply reel containing a supply of convoluted film with the leader of the film forming part of the outermost convolution of such supply; a friction drive including a driven endless flexible belt, a carrier for said belt, said carrier being pivotable about a predetermined axis to and from an operative position in which said belt engages the outermost convolution of film on the supply reel and rotates the supply reel in a direction to pay out successive increments of the film, and at least two rollers mounted on said carrier, said belt being trained over said rollers and one of said rollers being arranged to rotate about said axis; and deflecting means adjacent to said one roller for guiding said increments of motion picture film into a predetermined path away from contact with said belt so that the latter engages the film only in the operative position of said carrier, said deflecting means comprising two discrete guide rolls flanking said one roller and having diameters exceeding the diameter of that portion of said belt which is trained over said one roller, said guide rolls having peripheral surface means which guide said increments into said predetermined path.

6. A combination as defined in claim 5, wherein said peripheral surface means includes the peripheral surfaces of both guide rolls and wherein such surfaces taper axially toward said one roller.

7. In a cinematographic apparatus, particularly in a motion picture projector wherein motion picture film is transported from a supply reel toward a takeup reel, a combination comprising means for rotatably supporting a supply reel containing a supply of convoluted film with the leader of the film forming part of the outermost convolution of such supply; a friction drive including a driven endless flexible belt, a carrier for said belt, said carrier being pivotable about a predetermined axis to and from an operative position in which said belt engages the outermost convolution of film on the supply reel and rotates the supply reel in a direction to pay out successive increments of the film, and at least two rollers mounted on said carrier, said belt being trained about said axis; and deflecting means adjacent to said one roller for guiding said increments into a predetermined path away from contact with said belt so that the latter engages the film only in the operative position of said carrier, said deflecting means comprising a stationary guide member which at least partially surrounds that portion of said belt which is trained over said one roller.

8. A combination as defined in claim 7, wherein said guide member has a concave external film engaging surface.

9. A combination as defined in claim 1, further comprising biasing means for urging said carrier toward said operative position, disengaging means operative to normally hold said carrier against movement to said operative position, and manually operated means for rendering said disengaging means inoperative at the will of the operator so that said biasing means is then free to move the carrier to said operative position.

10. A combination as defined in claim 1, further comprising stripping means arranged to direct the leader of the supply of convoluted film away from the supply reel in response to movement of said carrier to said operative position and the resulting rotation of the supply reel.

* * * * *